Patented Feb. 3, 1942

2,271,834

UNITED STATES PATENT OFFICE 2,271,834

METHOD OF TREATING MERCAPTOTHIAZOLES WITH AMMONIA DERIVATIVES

Edward L. Carr, Akron, Ohio, assignor to The Firestone Tire & Rubber Company, Akron, Ohio, a corporation of Ohio No Drawing. Application March 3, 1939, Serial No. 259,712

5 Claims. (Cl. 260—306)

This invention relates to an improved method of treating mercaptothiazoles with ammonia derivatives and more particularly to an improved method of oxidizing a mixture of a 2-mercaptothiazole and ammonia or a mono- or di-substituted ammonia.

An unusual class of organic chemical compounds containing both nitrogen and sulfur may be prepared by oxidizing a mixture of a 2-mercaptothiazole and an ammonia derivative. The chemical structure of the organic chemical product of this reaction is not definitely known, but it is believed to be a derivative of thiohydroxylamine ($HSNH_2$). Thus, as an example, the oxidation of a mixture of 2-mercaptobenzothiazole and piperidine gives rise to a white crystalline organic compound melting at 80° C. This substance is believed to be N-pentamethylene, S-2-benzothiazyl thiohydroxylamine of the following structure

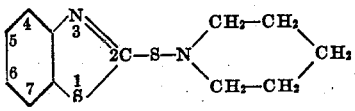

It has heretofore been proposed to prepare compounds having structures similar to that of the above example by heating together dibenzothiazyl disulfide and a secondary amine. A white crystalline product melting at 80° C. is obtained when the amine employed is piperidine. It has also been proposed to prepare the same type of compound by allowing the sodium salt of 2-mercaptobenzothiazole and the N-chloro derivative of a secondary amine to interact. Thus, by the use of N-chloro piperidine there is also produced a white crystalline substance melting at 80° C. The reaction products obtained by each of the three above-mentioned reactions are identical.

However, other structures are possible for this class of reaction products. For example, the above-mentioned reaction product of mercaptobenzothiazole and piperidine might possibly be a derivative of hydrazine, of the structure

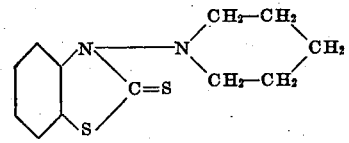

Appreciation of the fact that the two above-mentioned prior methods of producing the type of compounds discussed are rather expensive and are otherwise commercially impracticable has led to a study of other possible methods for preparing said compounds. Experiments have indicated that, although the oxidation of a mixture of a mercaptothiazole and an ammonia derivative generally produces some of the desired compound, quantitative results have not been obtained under all conditions. Especially, it has been found that the use of one of the cheapest oxidizing agents known, chlorine, produces very low yields when ordinary reaction conditions are employed.

After an extensive study of the oxidation reaction, it has now been found possible to use chlorine and yet obtain substantially quantitative yields of the practically pure desired products. It is desirable to employ at least two equivalents of an alkali to each equivalent of the mercaptothiazole, when chlorine is used, in order both to keep the mercaptothiazole in aqueous solution and to aid in the oxidation reaction itself. The use of at least two equivalents of the ammonia derivative is preferred in order completely to prevent the formation of a dithiazyl disulfide by the oxidation of two molecules of the mercaptothiazole. By means of the new method substantially quantitative yields of pure products may now, for the first time, be prepared very conveniently and at low cost.

Although it is desirable to employ at least two equivalents of an alkali for each equivalent of the mercaptothiazole, satisfactory results are also obtained with only one to two equivalents of alkali, providing that a corresponding increase in the ratio of ammonia derivative to mercaptothiazole is used. Thus, excellent yields are obtained from one equivalent of the mercaptothiazole, one equivalent of an alkali and at least three equivalents of the ammonia derivative. Of course, when chlorine is replaced by a hypohalite identical results are obtained with one equivalent of alkali and two equivalents of the ammonia derivative.

However, the present invention contemplates the use of smaller ratios of alkali and/or ammonia derivative to mercaptothiazole than the preferred ratios disclosed above. By means of the present method useful results are obtainable so long as the reaction solution is maintained in a distinctly alkaline condition.

A primary object of the present invention is to provide an improved method of oxidizing a mixture of a 2-mercaptothiazole and an ammonia derivative.

Another object is to provide a commercial method of oxidizing a mixture of a 2-mercaptothiazole and ammonia or a mono- or di-substituted ammonia to produce certain nitrogen and sulfur containing compounds at a much lower cost than heretofore possible.

Another object is to provide a method of oxidizing a mixture of a 2-mercaptothiazole and an ammonia derivative, in aqueous solution, by the use of chlorine, bromine, iodine or a suitable hypohalite.

A further object is to provide certain new organic compounds containing both nitrogen and sulfur, and to provide an efficient method for preparing them.

A further object is to provide an improved method of accelerating the vulcanization of rubber by means of a new class of organic compounds and to provide the improved rubber compositions thereby produced.

Broadly stated, the present invention consists in treating an aqueous alkaline solution comprising a 2-mercaptothiazole and a suitable ammonia derivative with chlorine, bromine, or iodine. The invention also contemplates substituting for one of the above-named halogens hypochlorous, hypobromous or hypoiodous acid, or an alkali metal or alkaline earth metal salt of one of said acids.

It is believed that a thiohydroxylamine is formed according to the present method by the simultaneous oxidation of one molecule of a mercaptothiazole (Tz represents a thiazyl radical in equations below) and one molecule of ammonia (or a mono- or di-substituted ammonia), as follows:

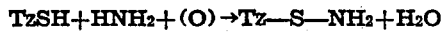
$$TzSH + HNH_2 + (O) \rightarrow Tz-S-NH_2 + H_2O$$

When a halogen such as chlorine is employed as the reagent in practicing the present invention, the course of the reactions is believed to agree with the following equations:

$$2MOH + Cl_2 \rightarrow MOCl + MCl + H_2O$$
$$MOCl + TzSH + NHRR' \rightarrow TzSNRR' + H_2O + MCl$$

In the above equations and throughout the specification and claims "M" (or "alkali metal") refers to any one of the group including lithium, sodium, potassium, and ammonium. The broader term "alkali" is meant to include alkali metal or alkaline earth metal oxides or hydroxides, or the chemical equivalents of these substances, such as the alkali metal carbonates. Obviously, an alkali, such as sodium carbonate or calcium oxide (plus water if necessary), may replace the alkali metal hydroxide of the first equation.

The ammonia derivative in the above equation is represented as NHRR', in which R and R' may be hydrogen or a radical derived from a hydrocarbon.

According to the above equations it will be seen that chlorine is thought to react first with the alkali present in the water solution to form an alkali metal hypochlorite. This latter compound is then the effective oxidizing agent for the main reaction, indicated in the second equation. For the purposes of the present invention, the step outlined in the first equation given above may be clearly eliminated and the method practiced by merely adding a hypochlorite to an aqueous solution comprising the mercaptothiazole and the ammonia derivative. In other words, it makes no substantial difference whether the hypohalite, necessary to the reaction, is formed in the reaction solution or is preformed and then added thereto. The choice of oxidizing reagent from the group mentioned above is dependent entirely on considerations of convenience or cost.

Ammonia derivatives contemplated as operable in the present method include, generally, compounds of the formula, NHRR', in which R and R' may be hydrogen or a radical derived from a hydrocarbon. Three types of ammonia derivatives are thus contemplated.

First, ammonia itself is represented when both R and R' of the formula, NHRR', are hydrogen.

Second, a mono-substituted ammonia of the primary amine type is represented by the general formula when the R is a hydrogen and R' is a radical derived from a hydrocarbon. Examples of the type of mono-substituted ammonia derivatives contemplated by the present invention are the following compounds: methyl amine, ethyl amine, propyl amines, butyl amines, amyl amines, hexyl amines, cyclohexylamine, benzyl amine, and such poly-amines as ethylene diamine.

Third, a di-substituted ammonia of the secondary amine type is represented by the general formula when both R and R' are radicals derived from hydrocarbons. In certain cases R and R' may be combined to form a cyclic structure such as that present in piperidine and other cyclic secondary amines. Examples of the type of di-substituted ammonia derivatives contemplated by the present invention are the following: dimethyl amine, diethyl amine, dipropyl amines, dibutyl amines, diamyl amines, piperidine, morpholine, cyclohexyl methylamine, and butyl methyl amine.

An ammonia derivative containing less than ten carbon atoms is preferred for solubility reasons, but the invention is not limited thereto.

The following examples are given as illustrative of the invention but not in limitation thereof.

*Example 1*

A reaction mixture was prepared containing 1600 grams of mercaptobenzothiazole, 960 grams of sodium hydroxide and 2440 grams of cyclohexylamine in a total volume of 48 liters. The molecular ratio of these reagents is: 1 mercaptobenzothiazole to 2.5NaOH to 2.5RNH$_2$. This ratio of reactants represents an excess of both alkali and amine over the amounts required by the stoichiometric equation:

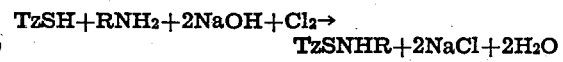
$$TzSH + RNH_2 + 2NaOH + Cl_2 \rightarrow TzSNHR + 2NaCl + 2H_2O$$

Excess of amine is employed in order to favor by means of mass action the coupling of mercaptobenzothiazole with the amine rather than with itself to form dibenzothiazyl disulfide. After the completion of the reaction the unused amine may be readily recovered by any suitable method, such as by salting it out of the solution. Excess of alkali is employed to facilitate absorption of chlorine toward the end of the reaction.

The reaction mixture, initially at 14° C., was contained in an iron drum which was fitted with 8 glass nozzles extending almost to the bottom of the solution. The depth of the solution was 30 cm.

The reaction was carried out as follows: Into the well stirred solution was passed by means of the nozzles a mixture of chlorine and air at the rate of 240 grams of chlorine per hour for 3 hours. The product precipitated concurrently with the introduction of chlorine. After 3 hours the solution was depleted of mercaptobenzothiazole as shown by acidifying a filtered sample of the solution.

The crystalline product, believed to be N-cyclohexyl, S-2-benzothiazyl thiohydroxylamine of the structure

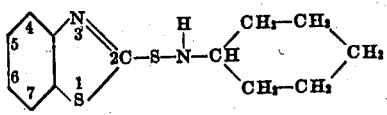

was collected, washed with water and dried. Without further purification it had a melting range of 93–99° C. The yield was practically quantitative on the basis of the mercaptobenzothiazole. A 7.5 per cent excess of chlorine was passed into the solution. During the course of the reaction the temperature gradually rose to 29° C. The chlorine-air mixture consisted of approximately 1 part of chlorine to from 10 to 20 parts of air.

The above run can be modified to give a greater quantity of product from a given volume of reaction solution. Thus, as the reaction progresses the consumed reactants can be renewed. In a run similar to the above, mercaptobenzothiazole, sodium hydroxide, cyclohexylamine and chlorine were continuously added to the reaction mixture in the ratio represented by the above stoichiometric equation until the total quantity of reactants consumed was four times that of the single run. The mercaptobenzothiazole and sodium hydroxide were added in the form of a solution 25 per cent in mercaptobenzothiazole and 15.6 per cent in sodium hydroxide. The amine was added without prior dilution. This multiple run procedure gave rise to a 50 per cent increase in the volume of the solution. The yield of product was 22.1 lbs., from 14 lbs. of mercaptobenzothiazole, which is quantitative.

Although the concentration of cyclohexylamine may vary greatly without substantially diminishing the success of the present method, it has been ascertained that a range of 30 to 100 grams of the amine per liter of the reaction solution favors the production of a purer product and a higher yield than otherwise obtainable.

Example 2

To 250 cc. of an aqueous solution containing 10 grams of mercaptobenzothiazole, 4.8 grams of sodium hydroxide and 24 grams of cyclohexylamine, there was slowly added with stirring a saturated aqueous solution of bromine. In the ensuing reaction the product precipitated as white crystals which, after being washed with water and dried, had a melting point of 100–101° C.

Example 3

A solution was prepared containing 10 grams of mercaptobenzothiazole, 4.8 grams of sodium hydroxide, and 17.8 grams of cyclohexylamine in a volume of 250 cc. To this solution there were added with stirring 200 cc. of an aqueous potassium iodide solution containing 15.3 grams of free iodine. The product precipitated in quantitative yield as white crystals of melting point 100° C.

Example 4

To 250 cc. of an aqueous solution containing 20 grams of mercaptobenzothiazole, 9.6 grams of sodium hydroxide and 48 grams of cyclohexylamine there was added with stirring a saturated aqueous solution of chlorine until the reaction mixture was depleted of mercaptobenzothiazole. The white crystalline product was removed from the solution, filtered and dried. Melting point 93° C. The yield was practically quantitative.

Example 5

An aqueous solution of sodium hypochlorite was introduced with stirring into 300 cc. of an aqueous solution containing 12.4 grams of the sodium salt of mercaptobenzothiazole and 24 grams of cyclohexylamine. White crystals precipitated, which, after being washed with water and dried, melted at 98–99° C.

Example 6

An aqueous solution of 300 cc. volume was prepared containing 10 grams of mercaptobenzothiazole, 4.8 grams of sodium hydroxide and 19 grams of benzylamine. Chlorine gas diluted with air was passed into the stirred solution until the mercaptobenzothiazole was depleted. The white crystalline product precipitated in practically quantitative yield. Melting point 115° C. The product is believed to be N-benzyl, S-2-benzothiazyl thiohydroxylamine of the structure

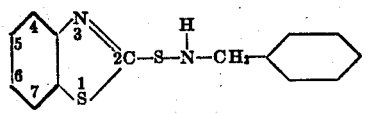

The above reaction product was proved to be identical with the reaction product formed by heating a mixture of dibenzothiazyl disulfide and benzylamine.

Example 7

A mixture of chlorine and air was introduced into an aqueous solution containing 10 grams of mercaptobenzothiazole, 4.8 grams of sodium hydroxide, and 15 grams of piperidine in a volume of 90 cc. The product precipitated as white crystals which melted at 80° C. The compound is thought to be N-pentamethylene, S-2-benzothiazyl thiohydroxylamine of the structure

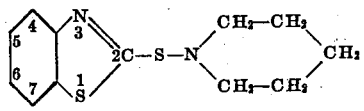

As it has already been shown, the above reaction product is identical to one prepared by heating dibenzothiazyl disulfide with piperidine.

Example 8

To 100 cc. of a stirred solution containing 10 grams of mercaptobenzothiazole, 2.4 grams of sodium hydroxide and 30 grams of ethylene diamine there was slowly added with stirring a 5 per cent solution of sodium hypochlorite. The product precipitated as white crystals of melting point 115° C.

Example 9

An aqueous solution was prepared containing 10 grams of mercaptobenzothiazole, 4.8 grams of sodium hydroxide and 21 grams of mixed monoamylamines in a volume of 250 cc. To this solution there were added with stirring 200 cc. of a solution containing 15.3 grams of iodine and 16 grams of potassium iodide. The product was obtained as an oil, which, on being washed and dried, set to a semi-crystalline condition. The yield was practically quantitative. The product is believed to be a mixture of compounds of the structure

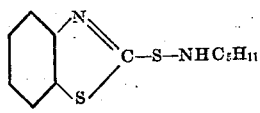

Example 10

A solution was prepared containing 10 grams of mercaptobenzothiazole, 2.4 grams of sodium hydroxide and excess concentrated ammonia in a volume of 100 cc. To this solution there was added with stirring a 10 per cent solution of sodium hypochlorite until the reaction mixture was depleted of mercaptobenzothiazole. The product was obtained in high yield as a white precipitate, which, after being washed with water and dried, melted at 125° C. The compound is believed to be S-2-benzothiazyl thiohydroxylamine of the structure

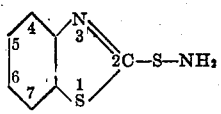

Example 11

A solution containing 12.5 grams of 6-nitro-mercaptobenzothiazole, 2.4 grams of sodium hydroxide and 18 grams of cyclohexylamine in a volume of 300 cc. was divided into two equal parts. To one portion was added with stirring a 5 per cent solution of sodium hypochlorite. A reaction ensued giving rise to an orange colored crystalline precipitate, which, after being well washed with water and dried, melted at 119° C.

To the second portion of the solution there were added 1.2 grams of sodium hydroxide. A mixture of air and chlorine was introduced into the resulting solution. The reaction product, obtained as an orange colored crystalline precipitate, was identical with that obtained by use of NaOCl. Melting point 119° C. The compound is believed to be N-cyclohexyl, S-2 (6-nitrobenzothiazyl) thiohydroxylamine of the structure

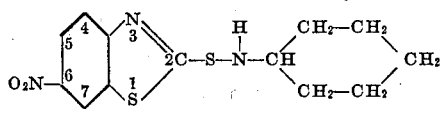

Example 12

An aqueous solution was prepared containing 10 grams of mercaptobenzothiazole, 4.8 grams of sodium hydroxide and 17.5 grams of mixed mono-butylamines in a volume of 250 cc. To this solution there was added with stirring 200 cc. of an aqueous potassium iodide solution containing 15.3 grams of free iodine. The product, an amber-colored oil, settled to the bottom. The oil was filtered (in ether solution) and then dried in a vacuum. The oil partially crystallized to a thick paste. The yield was 13.6 grams or 95 per cent of the theoretical. The product is believed to be a mixture of compounds of the structure

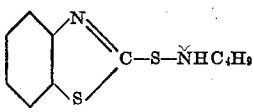

Example 13

An aqueous solution was prepared containing 10 grams of mercaptobenzothiazole, 5.2 grams of sodium hydroxide and 40 grams of morpholine in a volume of 300 cc. Chlorine gas was introduced into the atmosphere above the solution, and the latter was stirred to facilitate absorption of the chlorine. A white crystalline product separated. The product was collected, washed with water, and then dissolved in alcohol and reprecipitated by the addition of water. The white crystals, so obtained, melted at 85–87° C. The product is believed to possess the following structure

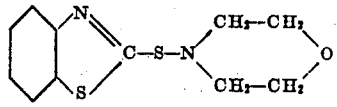

In addition to the mercaptothiazoles disclosed in the above examples, any other mercaptothiazole having the grouping

may be employed, examples being 2-mercapto-4-methyl-thiazole, 2-mercapto-4-phenyl-thiazole and aromatic mercaptothiazoles, such as 2-mercapto-benzothiazole, 2-mercapto-4-phenyl-benzothiazole, 2-mercapto-6-phenyl-benzothiazole, 2-mercapto-naphthothiazole and homologues or the various ring substitution products of these substances. As typical ring substituents there may be mentioned nitro, halogen, hydroxyl and alkoxyl groups.

The oxidizing reagent may be employed in a pure form or diluted with an inert material, such as water or air. In the appended claims it is to be understood that a reagent comprising one of the oxidizing substances comprises such substance in the chemical condition indicated and not in a state of chemical combination. Thus, "a reagent comprising chlorine" means a reagent comprising chemically uncombined chlorine.

Certain of the compounds produced as described above are especially effective in accelerating the vulcanization of rubber, either natural or synthetic. The preferred group of compounds which are remarkably satisfactory for this purpose consists of the reaction products of aromatic mercaptothiazoles and ammonia or certain of the monosubstituted ammonias. The group of ammonia derivatives suitable for preparing these improved accelerators may be defined by the formula $R_1NH_2$, wherein $R_1$ is a hydrogen, alkyl or amino-substituted alkyl group. Examples of reagents falling within this group are ammonia, methyl amine, ethyl amine, propyl amines, butyl amines, amyl amines, hexyl amines, octyl amines, and such polyamines as ethylene diamine, pentamethylene diamine and diethylene triamine.

To test the effect of the preferred group of compounds as accelerators of rubber vulcanization, three members were mixed into a "pure gum" rubber composition, as indicated by the following formulas:

|  | Composition | | |
| --- | --- | --- | --- |
|  | A | B | C |
| Rubber (smoked sheets) | 100.00 | 100.00 | 100.00 |
| Sulfur | 3.00 | 3.00 | 3.00 |
| Zinc oxide | 5.00 | 5.00 | 5.00 |
| Stearic acid | 1.10 | 1.10 | 1.10 |
| Product from mercaptobenzothiazole and amylamine (Example 9) | 0.75 |  |  |
| Product from mercaptobenzothiazole and ammonia (Example 10) |  | 0.75 |  |
| Product from mercaptobenzothiazole and butylamine (Example 12) |  |  | 0.75 |
|  | 109.85 | 109.85 | 109.85 |

The aforesaid compositions were vulcanized at 280° F. for 20 minutes. Test pieces of the vulcanized stocks were subjected to physical testing, the results of which are as follows:

| Composition | Accelerator | Modulus of elasticity in lbs./in.² at elongation of 600% | Tensile strength in lbs./in.² at break |
|---|---|---|---|
| A | Product from mercaptobenzothiazole and amylamine. | 1,550 | 3,600 |
| B | Product from mercaptobenzothiazole and ammonia. | 1,450 | 3,700 |
| C | Product from mercaptobenzothiazole and butylamine. | 2,150 | 3,450 |

The foregoing data clearly show that the preferred group of compounds are remarkably effective accelerators, bringing about very high tensile properties in the vulcanized rubber composition at an extremely short vulcanizing time. Under the same testing conditions a rubber composition containing no accelerator is not cured sufficiently to allow of tensile measurements. Moreover, a rubber composition containing a conventional accelerator, such as mercaptobenzothiazole, imparts considerably lower tensile properties to the composition than do the new class of accelerators.

Furthermore, the uncured rubber compositions containing as accelerators members of the preferred group of compounds herein described show no "set-up" or pre-vulcanization at ordinary processing temperatures. This valuable characteristic is surprising in view of the extremely rapid cures obtained at vulcanizing temperatures. A conventional accelerator, such as mercaptobenzothiazole, gives rise to considerable "set-up" in a rubber stock at processing temperatures, even though at higher temperatures it accelerates vulcanization less rapidly than do the new accelerators.

Modification may be resorted to and chemical equivalents may be employed without departing from the spirit of the invention or the scope of the appended claims.

What is claimed is:

1. The process which comprises reacting one equivalent of 2-mercaptobenzothiazole with one equivalent of ammonia in an aqueous medium comprising at least two equivalents of an inorganic alkali and at least 2.5 equivalents of ammonia with a reagent comprising an alkali metal hypochlorite, the temperature of the solution being maintained below 30° C.

2. The process which comprises reacting one equivalent of an aromatic 2-mercaptothiazole with one equivalent of an ammonia derivative of the formula $RNH_2$, wherein R is one of the group consisting of hydrogen and alkyl hydrocarbon radicals, in an aqueous medium comprising at least one equivalent of an inorganic alkali and at least one excess equivalent of the said ammonia derivative, with a reagent comprising a substance selected from the group consisting of chlorine, bromine, iodine, hypochlorous acid, hypobromous acid, hypoiodous acid, and alkali metal and alkaline earth metal salts of said acids, the temperature of the medium being maintained below 30° C.

3. The process which comprises oxidizing with a substance selected from the group consisting of hypohalous acids and alkali metal and alkaline earth metal salts thereof a mixture of one equivalent of 2-mercaptobenzothiazole and at least 2 equivalents of monobutylamine, in an aqueous medium comprising at least one equivalent of an alkali, the temperature of said aqueous medium being maintained below 30° C.

4. The process which comprises oxidizing with a substance selected from the group consisting of hypohalous acids and alkali metal and alkaline earth metal salts thereof a mixture of one equivalent of 2-mercaptobenzothiazole and at least two equivalents of monoamylamine, in an aqueous medium comprising at least one equivalent of an alkali, the temperature of said aqueous medium being maintained below 30° C.

5. S-2-benzothiazyl thiohydroxylamine.

EDWARD L. CARR.